United States Patent
Jacob et al.

(10) Patent No.: US 7,060,753 B2
(45) Date of Patent: Jun. 13, 2006

(54) THERMOPLASTIC ELASTOMERS HAVING IMPROVED BARRIER PROPERTIES

(75) Inventors: Sunny Jacob, Akron, OH (US); Jianya Cheng, Fairlawn, OH (US); Rainer Gehnen, Tervuren (BE)

(73) Assignee: ExxonMobil Chemical Patents Inc., Houston, TX (US)

( * ) Notice: Subject to any disclaimer, the term of this patent is extended or adjusted under 35 U.S.C. 154(b) by 238 days.

(21) Appl. No.: 10/330,511

(22) Filed: Dec. 27, 2002

(65) Prior Publication Data

US 2004/0127629 A1   Jul. 1, 2004

(51) Int. Cl.
*C08L 23/00* (2006.01)
*C08L 23/04* (2006.01)
*C08L 23/10* (2006.01)
*C08L 11/00* (2006.01)
*C08L 27/04* (2006.01)
*C08L 27/10* (2006.01)
*C08L 27/12* (2006.01)
C08F 214/18 (2006.01)

(52) U.S. Cl. .................. 525/191; 525/199; 525/200; 525/214; 525/215; 525/232; 525/240

(58) Field of Classification Search ............. 525/191, 525/199, 200, 214, 215, 232, 240
See application file for complete search history.

(56) References Cited

U.S. PATENT DOCUMENTS

| | | | |
|---|---|---|---|
| 3,037,954 A | 6/1962 | Gessler et al. | |
| 4,212,787 A | 7/1980 | Matsuda et al. | |
| 4,607,074 A | 8/1986 | Hazelton et al. | 524/425 |
| 4,616,052 A | 10/1986 | Habibullah | 524/104 |
| 5,143,978 A | 9/1992 | Berta | 525/240 |
| 6,790,911 B1 * | 9/2004 | Perevosnik et al. | 525/191 |

* cited by examiner

*Primary Examiner*—Nathan M. Nutter
(74) *Attorney, Agent, or Firm*—William A. Skinner; William G. Muller

(57) ABSTRACT

Thermoplastic vulcanizates having improved barrier properties, comprising a high melt flow index thermoplastic olefin resin, butyl rubber and an oligomer of isobutylene and butene.

9 Claims, No Drawings

US 7,060,753 B2

THERMOPLASTIC ELASTOMERS HAVING IMPROVED BARRIER PROPERTIES

FIELD OF THE INVENTION

This invention relates generally to thermoplastic elastomer materials. The invention relates more specifically to thermoplastic elastomers prepared from blends of thermoplastic olefin resin and dynamically vulcanized butyl rubber, modified by the addition of an oligomer of isobutylene and butene. The compositions of the invention have improved barrier properties, yet are easily processed.

BACKGROUND OF THE INVENTION

Thermoplastic elastomers are rubber-like materials that, unlike conventional vulcanized rubbers, can be processed and recycled like thermoplastic materials. When the thermoplastic elastomer contains a vulcanized rubber, it may also be referred to as a thermoplastic vulcanizate (TPV), defined as a thermoplastic elastomer with a chemically cross-linked rubbery phase, produced by dynamic vulcanization.

Thermoplastic vulcanizates containing butyl or halogenated butyl rubber as the rubber phase and a thermoplastic polyolefin as the plastic or resin phase are known in the art. In order to obtain good processability, the compositions may contain additives including oil, such as mineral oil, and slip agents, such as silicone fluids or fatty amides. While such additives improve processability characteristics, they adversely affect the barrier properties of the thermoplastic vulcanizates. Good barrier properties are important when the thermoplastic vulcanizates are used in contact with foods and beverages, for example as liners for container caps and lids, and in medical applications.

It is therefore desirable to provide a soft, easily processable thermoplastic vulcanizate with good barrier properties for use in food and beverage applications, but without the use of additives such as oil or slip agents.

SUMMARY OF THE INVENTION

The present invention is based on the discovery that a thermoplasic vulcanizate composition having the desired characteristics of softness, processability, elasticity and good gas barrier properties is provided by incorporating an oligomer of isobutylene and butene into a blend of thermoplastic polyolefin resin and dynamically vulcanized butyl rubber, in the absence of oil or slip agent. In detail the present invention relates to a thermoplastic vulcanizate composition comprising (a) a thermoplastic olefin resin selected from the group consisting of ultra-high melt flow index polypropylene, high melt flow index polyethylene, and mixtures thereof, (b) a fully cured rubber selected from the group consisting of butyl rubber, halogenated butyl rubber, and mixtures thereof, and (c) an oligomer of isobutylene and butene.

The composition of the invention overcomes the deficiencies described above, and is highly suitable for applications requiring contact with food and beverages.

DETAILED DESCRIPTION OF THE INVENTION

A thermoplastic elastomer (TPE) can be generically defined as a rubber-like material that, unlike conventional rubbers, can be processed and recycled like thermoplastic materials (ASTM D1566). When the TPE contains a vulcanized rubber, it may also be referred to as a thermoplastic vulcanizate (TPV), defined as a TPE with a chemically cross-linked rubbery phase, produced by dynamic vulcanization (ASTM D1566).

As used herein, the terms TPE and TPV refer to a blend of thermoplastic resin and vulcanized (cured; cross-linked) rubber. Such materials have the characteristic of elasticity, i.e. they are capable of recovering from large deformations quickly and forcibly. One measure of this rubbery behavior is that the material will retract to less than 1.5 times its original length within one minute, after being stretched at room temperature to twice its original length and held for one minute before release (ASTM D1566). Another measure is found in ASTM D412, for the determination of tensile set. The materials are also characterized by high elastic recovery, which refers to the proportion of recovery after deformation and may be quantified as percent recovery after compression. A perfectly elastic material has a recovery of 100% while a perfectly plastic material has no elastic recovery. Yet another measure is found in ASTM D395, for the determination of compression set.

Thermoplastic Polyolefin Component

The term "thermoplastic polyolefin" as used herein in conjunction with the description of the thermoplastic vulcanizate denotes any polyolefin resin which exhibits thermoplastic properties. A wide range of thermoplastic resins and/or their mixtures have been used in the preparation of thermoplastic vulcanizates, including polypropylene (PP), polypropylene copolymers, polyethylene (PE), polyethylene copolymers, cyclic olefin homopolymers or copolymers, as well as olefinic block copolymers, polystyrene, and ethylene propylene copolymer (EP) thermoplastics.

Thermoplastic resins useful in the compositions of the invention include crystalline and semi-crystalline polyolefin homopolymers and copolymers. They are desirably prepared from mono-olefin monomers, preferably those having 2 to 7 carbon atoms, such as ethylene, propylene, 1-butene, isobutylene, 1-pentene, 1-hexene, 1-heptene and mixtures thereof. The preferred polyolefin resins are polyethylene and polypropylene, and mixtures thereof.

As used in the specification and claims the term polyethylene includes both homopolymers of ethylene and copolymers with α-olefins, and linear and branched structures, and mixtures thereof. The polyethylene is partially crystalline in form, with both crystalline and amorphous phases. Commercially available types include low density polyethylene (LDPE), very low density polyethylene (VLDPE), linear low density polyethylene (LLDPE) and high density polyethylene (HDPE). Halogenated polyethylenes are also useful. High density polyethylene is the preferred type, and a polyethylene having a melt flow index (MFI) greater than about 30 g/10 minutes is most preferred for the practice of the invention.

As used in the specification and claims the term polypropylene includes homopolymers of propylene as well as reactor and/or random copolymers of propylene which can contain about 1 to about 30 weight percent of ethylene and/or an α-olefin comonomer of 4 to 20 carbon atoms, and mixtures thereof. The polypropylene can have different types of crystalline structure such as atactic, isotactic and syndiotactic, and different degrees of crystallinity including materials with a high percentage of amorphous structure such as the elastomeric polypropylenes. The preferred type for practice of the invention is isotactic polypropylene having a MFI greater than about 100 g/10 minutes, and polypropylenes having melt flow index (MFI) greater than about 750 g/10 minutes are most preferred.

The polyolefins mentioned can be made using conventional Ziegler/Natta catalyst systems or by single site catalyst systems. Commercially available polyolefins may be used in the practice of the invention.

The amount of thermoplastic polyolefin found to provide useful thermoplastic vulcanizate compositions is from about 5 to about 90 weight percent, based on the total weight of the thermoplastic polyolefin and rubber components, with the proviso that the total amount of thermoplastic polyolefin and rubber is greater than about 35 weight percent of the total weight of the TPV composition.

Rubber Component

Butyl rubbers are preferred in the practice of the invention. As used in the specification and claims, the term butyl rubber includes copolymers of a major portion of an isoolefin and a minor portion, preferably not more than about 30 weight percent, of a conjugated multiolefin, and their halogenated derivatives. The copolymers generally comprise about 85 to 99.5 weight percent (preferably about 95 to 99.5 weight percent) of a $C_4$ to $C_7$ isoolefin and about 15 to 0.5 weight percent (preferably about 5 to 0.5 weight percent) of a multiolefin of 4 to 14 carbon atoms. Suitable conjugated multiolefins include isoprene, butadiene, dimethyl butadiene, piperylene, and the like. The preferred isoolefin is isobutylene (2-methylpropene) and the preferred multiolefin is isoprene (2-methyl-1,3-butadiene). Commercial butyl rubber (IIR) is a copolymer of isobutylene with minor amounts of isoprene.

The amount of butyl rubber found to provide useful thermoplastic vulcanizate compositions is from about 10 to about 95 weight percent, based on the total weight of the thermoplastic polyolefin and rubber components. Preferred compositions contain about 40 to about 55 weight percent butyl or halobutyl rubber.

Oligomer Component

The term "oligomer" is used herein in its generally accepted sense as defining a polymer molecule consisting of only a few monomer units, i.e. a dimer, trimer or tetramer. In the present invention it has been found that the inclusion of an oligomer of isobutylene and n-butene (1-butene; α-butylene) in the thermoplastic vulcanizate provides unexpected barrier properties, unlike the use of conventional process oils and slip agents. The oligomer of isobutylene and n-butene, also known as polybutene, is present in the thermoplastic vulcanizate at levels of about 10 to about 30 weight percent, based on the total weight of the thermoplastic vulcanizate composition, with about 15 to about 25 weight percent being preferred.

Fillers and Additives

Generally, the addition of fillers and/or additives is conventional in the art of thermoplastic vulcanizate preparation. The term "filler" as used herein refers to non-reinforcing fillers, reinforcing fillers, organic fillers and inorganic fillers. Preferably the filler is an inorganic filler such as talc, silica, clays, solid flame retardants, calcium carbonate, titanium dioxide, barium sulfate, carbon black, other mineral fillers and mixtures thereof. Any effective amount of filler may be added. Typically the filler may be added in an amount of up to about 60 weight percent, and preferably from about 2 to about 50 weight percent of the total thermoplastic vulcanizate composition. Suitable additives include pigments, antistatic agents, antioxidants (chemical or physical protectants), ultraviolet light stabilizers, antiblocking agents, lubricants, waxes, coupling agents for fillers and mixtures thereof. Additives such as polysiloxane fluids and fatty acid amides may be included to improve processability characteristics. Any effective amount of additive may be used. Typically the amounts range from about 0.05 to about 5 weight percent, and preferably from about 0.05 to about 3 weight percent, based on the total weight of the composition.

Fillers and/or additives may be added to the composition at any point in the preparation, for example prior to vulcanization, during vulcanization or after vulcanization. As an alternative, the thermoplastic vulcanizate may be produced without fillers or additives, which are then added in a later compounding operation.

Cure Systems

In the composition of the invention, the butyl rubber component of the thermoplastic vulcanizate will be partially or fully cured (vulcanized; crosslinked). Those of ordinary skill in the art will appreciate the appropriate quantities, types of cure systems, and processing conditions required to carry out the cure of the rubber and obtain the desired degree of cure. Any known cure system can be used, so long as it is suitable under the curing conditions for the rubber being used and is compatible with the thermoplastic polyolefin component of the thermoplastic vulcanizate. These cure systems include sulfur, sulfur donors, metal oxides, resin systems, hydrosilylation systems, high-energy systems and the like, both with and without accelerators and co-agents.

Phenolic resin cure systems are preferred for the preparation of the thermoplastic vulcanizates of the invention, and such cure systems are well known in the art and literature of vulcanization of rubbers. Their use is more fully described in U.S. Pat. No. 4,311,628 and U.S. Pat. No. 5,592,425, the disclosures of which are fully incorporated herein by this reference. For further details of phenolic cure systems see "Vulcanization and Vulcanizing Agents", W. Hoffman, Palmerton Publishing Company. Suitable phenolic curing resins and brominated phenolic curing resins are commercially available under the trade names SP-1045, CRJ-352, SP-1055 and SP-1056 from Schenectady Chemicals, Inc. Similar functionally equivalent phenolic curing resins may be obtained from other suppliers.

For halogenated butyl rubbers, a preferred cure system is one which is based on ZnO and/or MgO. In this system, the MgO does not act as an activator but as an acid acceptor to stabilize the rubber from dehydrohalogenation. Another cure system for halogenated butyl rubbers comprises ZnO and a maleimide product. Among the maleimide products, a bis-maleimide is especially superior in effectiveness and m-phenylene bismaleimide (4,4'-m-phenylene bismaleimide) (HVA-2) is preferred.

Organic peroxides with well known co-agents can also be used as a cure system, except where the butyl rubber is a non-halogenated butyl rubber. The role of the co-agent in peroxide cure systems is to enhance the cure state and to inhibit chain fragmentation or scission effects.

General Procedure

The rubber component of the thermoplastic vulcanizate is generally present as small, i.e. micro-size, particles within a continuous thermoplastic polyolefin resin matrix, although a co-continuous morphology is also possible depending upon the amount of rubber relative to the thermoplastic resin and the degree of cure of the rubber. The rubber cure is achieved by adding an appropriate cure system to a blend of thermoplastic polyolefin and rubber, the curing the rubber to the desired degree under vulcanizing conditions. It is preferred that the rubber be cured by the process of dynamic vulcanization. As used in the specification and claims, the term "dynamic vulcanization" means a curing process for a rubber contained in a blend of thermoplastic resin, wherein the curable rubber is vulcanized under conditions of shear at a temperature above the melting point of the thermoplastic polyolefin component. The rubber is thus simultaneously crosslinked and dispersed as fine particles within the thermoplastic polyolefin matrix, although as noted above, other morphologies may also exist. Dynamic vulcanization may be carried out in conventional mixing equipment such as roll mills, Banbury mixers, Brabender mixers, continuous mixers, mixing extruders such as single and twin-screw extruders, and the like. The unique characteristic of dynamically cured compositions is that, notwithstanding the fact that the rubber component is cured, the compositions can be processed and reprocessed by conventional plastic processing techniques such as extrusion, injection molding and compression molding. Scrap or flashing can be salvaged and reprocessed.

Preferably, after the thermoplastic polyolefin and rubber are intimately mixed, the cure system is added. Heating and masticating at vulcanization temperatures are then generally adequate to achieve the curing reaction in a few minutes or less. If shorter cure times are desired, higher temperatures may be used. A suitable range of cure temperature is from about the melting point of the thermoplastic polyolefin, i.e. about 120° C. to 250° C. or higher. Typically the range is from about 150° C. to about 225° C. To obtain thermoplastic vulcanizates, it is preferred that mixing continues without interruption until the desired cure level is obtained. Mixing is continued until a maximum mixing torque indicates that cure has occurred.

The term "partially cured" as used herein means that not all of the rubber component capable of being cured by the cure system, has been cured. The term "fully cured" as used herein means that the rubber component has been cured to a state in which the elastomeric properties of the cured rubber are similar to those of the same rubber in its conventional vulcanized state, apart from the thermoplastic vulcanizate composition. Simply stated, fully cured means that all of the rubber component which is capable of being cured, has been cured. The degree of cure can be described in terms of gel content or conversely, extractable components. Where the determination of extractables is an appropriate measure of the state of cure, fully cured thermoplastic vulcanizates are produced by vulcanizing the curable rubber to the extent that the composition contains, with increasing preference in the order given, no more than about 1 to 4, preferably 2 to 3, weight percent of the rubber extractable by a solvent for the rubber. Compositions having less than about 0.5 weight percent extractable rubber are highly preferred. Alternatively the degree of cure may be expressed in terms of crosslink density. All of these descriptions are known in the art, for example from U.S. Pat. No. 5,100,947 and U.S. Pat. No. 5,157,081.

The thermoplastic vulcanizate of the present invention is used in processes for making shaped articles by conventional techniques such as injection molding, extrusion molding, blow molding, lamination, calendaring, overmolding and over-extrusion.

EXAMPLES

The following materials were used in the examples.
Butyl 268—isoprene/isobutylene rubber, 46–55 Mooney viscosity (1+8) 125° C., from ExxonMobil Chemical Company.
Chlorobutyl 1068—chlorinated isoprene/isobutylene rubber, 33–43 Mooney viscosity (1+8) 125° C., from ExxonMobil Chemical Company.
PP EOD 96-36—polypropylene, MFI 750, from Fina.
PE H6733—high density polyethylene, MFI 33, from ExxonMobil Chemical Company.
PE H5057—high density polyethylene, MFI 57, from Equistar.
Indopol 100H—oligomer of isobutylene and n-butene, from BP Amoco.
Butyl zimate—cure accelerator, from Vanderbilt.
Kemamide U—oleamide from Humko Chemical Division.
DC 200—dimethyl polysiloxane fluid from Dow Corning.
Plastol 542—mineral oil, from ExxonMobil Chemical Company.
Icecap K Clay—aluminum silicate, from Burgess Pigment.
ZnO—zinc oxide (any source).
$SnCl_2$ —tin chloride monohydrate (any source).
SP 1045—alkyl phenol formaldehyde, from Schenectady International.
Optema TC 140—ethylene methylacrylate copolymer, 21.5% methylacrylate, MFI 135, from Exxon Mobil Chemical Company.
Escorene 7032—polypropylene copolymer, from ExxonMobil Chemical Company.
Proflow 1000—low molecular weight polypropylene, from Poly Visions, Inc.
Crodamide E—erucamide slip agent, from Croda Universal.
Maglite—magnesium oxide, from C. P. Hall.
Zinc stearate—from Harwick Chemical.
CP 1500P—isotactic polypropylene, MFI 1500 g/10 min., developmental grade from Aristech Sunoco Chemicals.

The following measurement methods (standards) were used in determining the properties of compositions of the invention:
Hardness (Shore A)—ASTM D2240
UTS (ultimate tensile strength)—ASTM D412
UE (ultimate elongation)—ASTM D412
M100 (modulus)—ASTM D412
Color—Hunter Lab test apparatus which measures color on a three axis system (L, a, b)
CS (compression set)—ASTM D395(B)
LCR (shear viscosity)—Measured at 204° C. and 1200 $sec^{-1}$ with Kayeness laboratory capillary rheometer from Dynasco.
ACR (shear viscosity)—Measured with an automated capillary rheometer equipped with an AX150 33/1 L/D, 0.031 diameter orifice, at 204° C. and 118 kPa.
ESR (extrusion surface rating)—Internal test method similar to ANSI B46.1; the product is extruded into strips under standard conditions of a 2.54 cm or 3.81 cm diameter extruder with a 24/1 L/D screw having a 3–3.5:1 compression ratio; a strip die 25.4 mm wide by 0.5 mm thick and 7–10 mm land length; temperature profile is 180° C. (feed zone), 190° C.–200° C.–205° C. (die zone); surface smoothness is measured with a stylus profilometer, and the arithmetic average of the surface irregularity (Ra) is taken; smaller values mean better surface smoothness.
Permeability—ASTM D1434
TS (tension set)—ASTM D412
EB (elongation at break)—ASTM D412
MFI (melt flow index)—ASTM D1 238, condition 'L'

The following typical procedure was used in carrying out the examples of the invention. A Werner & Pfleiderer twin screw extruder was charged at the entry port with the thermoplastic olefin resin, rubber and other compounding ingredients except the cure system. The oligomer component can all be added to the mixing device at this point, or it may be split so that only a portion is added the blend at the entry port and the remainder is added after the vulcanization zone. In the first third of the extruder, the composition is masticated to melt the thermoplastic resin and to form an essentially homogeneous blend. The cure system is added through another entry port (vulcanization zone) located-about one-third of the length of the extruder barrel downstream from the initial entry port. A vent operating under reduced pressure is located near the outlet to remove any volatile by-products. If used, process oil and other additives may be added at another entry port located about the middle of the vulcanization zone. Additives which may reduce the cure system activity are added downstream after the vulcanization zone. The temperature profile used was 170° C. (feed zone)–175° C.–180° C.–190° C.–200° C. (die zone). The final melt blend was pelletized under water.

TABLE 1

| | C1 | C2 | C3 | C4 | C5 | 6 | 7 | 8 | 9 | 10 | 11 | C12 | 13 | 14 | 15 | 16 | 17 | 18 |
|---|---|---|---|---|---|---|---|---|---|---|---|---|---|---|---|---|---|---|
| Butyl 268[1] | 100 | 100 | 100 | 100 | 100 | 100 | 100 | 100 | 100 | 100 | 100 | 100 | 100 | 100 | | | | 100 |
| Chlorobutyl 1068 | | | | | | | | | | | | | | | 100 | 100 | 100 | |
| ZnO | 0.8 | 0.8 | 0.8 | 0.8 | 0.8 | 0.8 | 0.8 | 0.8 | 0.8 | 0.8 | 0.8 | 0.8 | 0.8 | 0.8 | 4 | 4 | 4 | 0.8 |
| Clay | 10 | 10 | 10 | 10 | 10 | 10 | 10 | 10 | 10 | 10 | 10 | 10 | 10 | 10 | 10 | 10 | 10 | 10 |
| Maglite | | | | | | | | | | | | | | | 2 | 2 | 2 | |
| Zn stearate | | | | | | | | | | | | | | | 1 | 1 | 1 | |
| Butyl Zimate | | | | | | | | | | | | | | | | 2 | 2 | |
| PP EOD 96-36 | 45 | 45 | 45 | 45 | 45 | 45 | 45 | 45 | 45 | | | | | | 25 | 45 | 25 | 25 |
| PE H5057 | | | | | | | | | | | | | 45 | 45 | 45 | | | |
| PE HD6733 | | | | | | | | | | 45 | 45 | | | | | | | 20 |
| Indopol 100H | | | | 25 | 40 | 45 | 45[2] | 35 | 35 | | | | 35 | 35 | 25 | 35 | 35 | 20 + 25[3] |
| CP1500P | | | | | | | | | | | | | | | 20 | | 20 | |
| Crodamide | | | | | | | | | | | 1.5 | | | 1.5 | 6.85 | | 1.5 | |
| DC 200 | | | | | | | | | | | | | | | 7 | | | |
| SnCl$_2$ | 1.3 | 1.3 | 1.3 | 1.3 | 1.3 | 1.3 | 1.3 | 1.3 | 1.3 | 1.3 | 1.3 | 1.3 | 1.3 | 1.3 | | | | 1.3 |
| SP-1045 | 5 | 5 | 5 | 5 | 5 | 5 | 5 | 5 | 5 | 5 | 5 | 5 | 5 | 5 | | | | 5 |
| Plastol 542 | 20 | 40 | 60 | 80 | | | | | | | | | | | | | | |
| TOTAL | 182.1 | 202.1 | 222.1 | 242.1 | 162.1 | 187.1 | 202.1 | 207.1 | 207.1 | 197.1 | 198.6 | 162.1 | 197.1 | 198.6 | 200.9 | 199 | 200.5 | 207.1 |

[1]All amounts are expressed as parts by weight per hundred parts by weight of rubber (PHR)
[2]50% of Indopol added at entry port, 50% added after vulcanization zone
[3]20 phr Indopol added at entry port, 25 phr added after vulcanization zone

TABLE 2

| | C1 | C2 | C3 | C4 | C5 | 6 | 7 | 8 | 9 |
|---|---|---|---|---|---|---|---|---|---|
| Hardness (Shore A) | 80 | 74 | 68 | 62 | 87 | 76 | 73 | 74 | 69 |
| Specific gravity | 0.95 | 0.94 | 0.94 | 0.93 | 0.96 | 0.96 | 0.94 | 0.95 | 0.95 |
| UTS (psi) | 1115 | 796 | 655 | 513 | 1226 | 894 | 725 | 820 | 578 |
| UE (%) | 439 | 337 | 316 | 318 | 431 | 323 | 274 | 408 | 313 |
| M100 (psi) | 508 | 417 | 338 | 266 | 650 | 549 | 452 | 397 | 351 |
| Color: | | | | | | | | | |
| L | 43.6 | 55.4 | 64 | 67.2 | 33.8 | 53.6 | 56.8 | 57.0 | 67.2 |
| a | 4.85 | 1.75 | -0.0 | -2.8 | 4.32 | 4.15 | 2.94 | 2.16 | 1.66 |
| b | 8.49 | 13.7 | 17.1 | 19.8 | 4.53 | 9.64 | 11.4 | 12.6 | 11.8 |
| LCR Pa · s (@1200 1/s) | 110 | 88.8 | 72.7 | 59.4 | — | 97.2 | 82.5 | 81.1 | — |
| ACR (poise) | 1370 | 781 | 307 | 128 | 3592 | 812 | 435 | 470 | 335 |
| ESR | 204 | Too High | Too High | Too High | — | 71 | 63 | 85 | 66 |
| Tension set (%) | 18 | 15 | 12 | 9 | 24 | 18 | 18 | 15 | 20 |
| CS (%) 100° C., 22 hrs | 46.2 | 40.9 | 39.8 | 35.9 | 50.9 | 36.1 | 30.3 | 40.3 | 35 |
| CS (%) 80° C., 22 hrs | 44.4 | 39 | 36.4 | 29.7 | 49.2 | 34.3 | 29.2 | — | 31.2 |
| Permeability cm$^3$, 100 µ/m$^2$ · day | 1032 | 1970 | 3076 | 4487 | 537 | 658 | 765 | — | 838 |

| | 10 | 11 | C12 | 13 | 14 | 15 | 16 | 17 | 18 |
|---|---|---|---|---|---|---|---|---|---|
| Hardness (Shore A) | 64 | 65 | — | 61 | 62 | 73 | 72 | 63 | 64 |
| Specific gravity | 0.95 | 0.96 | — | 0.96 | 0.96 | 0.97 | 0.96 | 0.96 | 0.95 |
| UTS (psi) | 496 | 553 | — | 521 | 625 | 370 | 533 | 497 | 588 |
| UE (%) | 460 | 420 | — | 430 | 406 | 227 | 242 | 341 | 461 |
| M100 (psi) | 259 | 274 | — | 279 | 306 | 338 | 402 | 292 | 248 |
| Color: | | | | | | | | | |

TABLE 2-continued

| | | | | | | | | | |
|---|---|---|---|---|---|---|---|---|---|
| L | 50.6 | 63.3 | — | 45.7 | 61.8 | 83 | 80.7 | 78.1 | 61.3 |
| a | 3.3 | 2.17 | — | 5.26 | 2.59 | −0.7 | −1.1 | −1.3 | −3.1 |
| b | 9.29 | 10.2 | — | 7.02 | 11 | 5.54 | 8.47 | 9.93 | 9.65 |
| LCR Pa · s (@1200 1/s) | 214.2 | 187.4 | — | 153.1 | 146.9 | 45.4 | 77.2 | 96.8 | 105.5 |
| ACR (poise) | — | — | — | — | — | 112 | 322 | 685 | 1127 |
| ESR | 211 | 122 | — | 138 | 75 | — | — | — | — |
| Tension set (%) | 21 | 21 | — | 16 | 16 | 40 | 26 | 19 | — |
| CS (%) 100° C., 22 hrs | 30.3 | 28.6 | — | 27.1 | 27.6 | 76.5 | 40.5 | 39.2 | 30.6 |
| CS (%) 80° C., 22 hrs | — | — | — | — | — | 72.2 | 37.9 | 36.6 | 28.4 |
| Permeability cm³, 100 μ/m² · day | — | — | — | 713 | 788 | — | 837 | 1065 | 897 |

In Tables 1 and 2 the examples C1–C5, and C12 are comparative examples, and do not represent examples of the invention. Table 1 sets forth the formulations of comparative examples C1–C5 and C12, and formulations of examples of the invention 6–11 and 13–18. Table 2 sets forth the properties of the thermoplastic vulcanizates prepared from these formulations.

Examples C1–C4 set forth formulations and properties of thermoplastic vulcanizates prepared using conventional mineral oil plasticizer, Plastol 542. Example C5 is a thermoplastic vulcanizate comprising butyl rubber and polypropylene, prepared without plasticizer. Examples 6–9 set forth thermoplastic vulcanizates comprising butyl rubber, polypropylene and an oligomer of isobutylene and butene as a plasticizer. It is notable that these latter thermoplastic vulcanizates showed good surface characteristics (low ESR), low viscosity and good elastic properties. The permeability increased with increasing levels of isobutylene-co-butene oligomer, but the negative effect of this material was less pronounced than in those formulations where mineral oil plasticizer was used. Thermoplastic vulcanizates with permeability values in the range of 600–800 cm³.100 μm/m².day are suitable for packaging of foods, for example as beverage bottle cap liners.

Examples 10–11 and 13–14 set forth thermoplastic vulcanizates comprising butyl rubber, polyethylene and an oligomer of isobutylene and butene as a plasticizer. It is notable that these products had good permeablility and were readily processable, with good color. Example C12 is a formulation containing polyethylene and butyl rubber with no plasticizer. This formulation was not processable, appearing dark and degraded as it exited the extruder.

Examples 16–17 set forth forth thermoplastic vulcanizates comprising chlorobutyl rubber, polypropylene and an oligomer of isobutylene and butene as a plasticizer. The chlorobutyl rubber in these formulations was cured with zinc oxide. Thermoplastic vulcanizate of the invention was also prepared using blends of polypropylene and polyethylene as the thermoplastic polyolefin component, as in Example 18.

While in accordance with the Patent Statutes the best mode and preferred embodiment are set forth, the scope of the invention is not limited thereto but rather by the scope of the claims.

What is claimed is:

1. A thermoplastic vulcanizate consisting essentially of (a) a thermoplastic olefin resin selected from the group consisting of ultra high melt flow index polypropylene, high melt flow index polyethylene, and mixtures thereof; (b) a fully cured rubber selected from the group consisting of butyl rubber, halobutyl rubber, and mixtures thereof; and (c) an oligomer of isobutylene and butene.

2. The thermoplastic vulcanizate of claim 1 wherein the thermoplastic olefin resin (a) is present in the range of about 20 to about 45 weight percent, the rubber (b) is present in the range of about 40 to about 55 weight percent and the oligomer of isobutylene and butene (c) is present in the range of about 15 to about 25 weight percent, based on the total weight of (a)+(b)+(c).

3. The thermoplastic vulcanizate of claim 1 wherein said polypropylene has a melt flow index in the range of about 100 g/10 min to about 1800 g/10 min, and said polyethylene has a melt flow index in the range of about 25 g/10 min to about 100 g/10 min.

4. The thermoplastic vulcanizate of claim 1 wherein said thermoplastic olefin resin is polypropylene having a melt flow index in the range of about 500 g/10 min to about 1000 g/10 min, and said rubber is butyl rubber.

5. The thermoplastic vulcanizate of claim 1 wherein the permeability is less than about 1200 cm³, 100 μm/m² · day.

6. The thermoplastic vulcanizate of claim 1, additionally containing a minor amount of butyl zimate.

7. The thermoplastic vulcanizate of claim 1, additionally containing polysiloxane fluid, fatty acid aniide, or mixtures thereof.

8. A process for the preparation of the thermoplastic vulcanizate of claim 1, comprising the steps of (a) blending a thermoplastic olefin resin selected from the group consisting of ultra high melt flow index polypropylene, high melt flow index polyethylene, and mixtures thereof; a rubber selected from the group consisting of butyl rubber, halobutyl rubber, and mixtures thereof; an oligomer of isobutylene and butene; and optionally fillers and additives, (b) adding to the resulting blend a cure system for the rubber, (c) dynamically vulcanizing the rubber under conditions of heat and shear, and (d) recovering the thermoplastic vulcanizate.

9. The process of claim 8 wherein a portion of the oligomer of isobutylene and butene is added in step (a) and a portion is added subsequent to step (c).

* * * * *